(12) United States Patent
Sevitsky et al.

(10) Patent No.: US 6,557,011 B1
(45) Date of Patent: Apr. 29, 2003

(54) METHODS FOR ANALYZING DYNAMIC PROGRAM BEHAVIOR USING USER-DEFINED CLASSIFICATIONS OF AN EXECUTION TRACE

(75) Inventors: Gary S. Sevitsky, New York, NY (US); Wim DePauw, Scarborough, NY (US); Olivier Gruber, Jackson Heights, NY (US); Ravi B. Konuru, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 09/703,163

(22) Filed: Oct. 31, 2000

(51) Int. Cl.[7] .............................................. G06F 17/30
(52) U.S. Cl. .................................................. 707/104.1
(58) Field of Search ............................... 707/3, 10, 100, 707/104.1; 702/179; 714/1; 717/101, 104, 108, 119, 124, 129, 131, 133, 128, 130, 158

(56) References Cited

U.S. PATENT DOCUMENTS 6,083,281 A * 7/2000 Diec et al. ..................... 714/1
6,349,406 B1 * 2/2002 Levine et al. ............... 702/179

* cited by examiner

*Primary Examiner*—Diane D. Mizrahi
*Assistant Examiner*—Apu Mofiz
(74) *Attorney, Agent, or Firm*—Scully, Scott, Murphy & Presser; Douglas W. Cameron, Esq.

(57) ABSTRACT

A method and system for analyzing dynamic behavior of a computer program using user-defined classifications of an execution trace. The method comprises the step of forming a database describing the executions of the program. The database includes static information obtained from the program source, and dynamic information describing particular executions of the program. The database is structured into entities, and each of the entities is comprised of a single type of information about the program execution. Each entity is comprised of elements representing individual program elements of said single type, and each element has attributes with values describing the element. The database is augmented by classifying every element of the database as a member of zero or more user defined execution slices; and dynamic behavior of the program is analyzed using the execution slices.

26 Claims, 20 Drawing Sheets

Data Model Diagram

Package – represents a Java package

| Attribute | Description | Type |
|---|---|---|
| name | full package name | simple |
| short name | package name proper | simple |
| parent | containing package | 1 to 1 relationship |
| packages | subpackages | 1 to many relationship |
| classes | Classes this in package | 1 to many relationship |
| number of calls-object | number of calls where the target object is in this package* | summary |
| total base time-object | total base time in calls where the target object is in this package* | summary |
| total cumulative time-object | total cumulative time in calls where the target object is in this package* | summary |
| number of calls-method | number of calls where the method is in this package* | summary |
| total base time-method | total base time in calls where the method is in this package* | summary |
| total cumulative time-method | total cumulative time in calls where the method is in this package* | summary |
| number of instances | number of instances of classes of this package* | summary |
| number of live instances | number of instances of classes of this package, that have not been garbage collected* | summary |
| size of instances | total memory size of instances of classes of this package* | summary |
| size of live instances | total memory size of instances of classes of this package that have not been garbage collected* | summary |

*includes the entire hierarchy of subpackages of this package.

Fig. 2

Class – represents a Java class or interface

| Attribute | Description | Type |
|---|---|---|
| name | fully qualified class name | simple |
| short name | class name proper | simple |
| instance size | instance size. For non-array classes only. | simple |
| is array | true=array class | simple |
| package | containing package | 1 to 1 relationship |
| instances | the instances of this class | 1 to many relationship |
| methods | methods implemented by this class | 1 to many relationship |
| classes | classes in this package | 1 to many relationship |
| number of calls-instance | number of calls where the target object is in this class | summary |
| total base time-instance | total base time in calls where the target object is in this class | summary |
| total cumulative time-instance | total cumulative time in calls where the target object is in this class | summary |
| number of calls-method | number of calls where the method is in this class | summary |
| total base time-method | total base time in calls where the method is in this class | summary |
| total cumulative time-method | total cumulative time in calls where the method is in this class | summary |
| number of instances | number of instances of classes of this class | summary |
| number of live instances | number of instances of classes of this class, that have not been garbage collected | summary |
| size of instances | total memory size of instances of this class | summary |
| size of live instances | total memory size of instances of this class that have not been garbage collected | summary |

Fig. 3

Instance – represents a Java object

| Attribute | Description | Type |
|---|---|---|
| class | class of instance | 1 to 1 relationship |
| id | uniquely identifies instance within this class | simple |
| is live | true = instance hasn't been garbage collected | simple |
| is class object | true = instance is the class instance, representing static members | simple |
| instance size | instance size. | simple |
| creation time | time at which the instance was created | simple |
| collection time | time at which the instance was garbage collection | simple |
| lifespan | time between creation and garbage collection | simple |
| generation | id of memory snapshot in which this object was reported | simple |
| referees | instances which refer to this instance | 1 to many relationship |
| referands | instances to which this instance refers | 1 to many relationship |
| indirect referees | transitive closure of "referees" relationship | 1 to many relationship |
| indirect referands | transitive closure of "referands" relationship | 1 to many relationship |
| number of calls | number of calls where this is the target object | summary |
| total base time | total base time of calls where this is the target object | summary |
| total cumulative time | total cumulative time of calls where this is the target object | summary |

Invocation – represents a method call

| Attribute | Description | Type |
|---|---|---|
| name | method name | simple |
| signature | method signature | simple |
| full name | method name + signature | simple |
| class | implementing class of method | 1 to 1 relationship |
| is constructor | true = is a constructor | simple |
| is class constructor | true = static constructor | simple |
| number of calls | number of calls to this method | summary |
| total base time | total base time of calls to this method | summary |
| total cumulative time | total cumulative time of calls to this method | summary |

Fig. 4b

Thread – represents a Java thread

| Attribute | Description | Type |
|---|---|---|
| name | thread name | simple |
| thread object | java instance representing the thread | 1 to 1 relationship |
| thread class | java class of thread object | 1 to 1 relationship |
| number of calls | number of calls in this thread | summary |
| base time | total base time of calls in this thread | summary |
| cumulative time | total cumulative time of calls in this thread | summary |

Invocation – represents a method call

| Attribute | Description | Type |
|---|---|---|
| method | method | 1 to 1 relationship |
| source object | instance issuing the method call | 1 to 1 relationship |
| target object | instance receiving the method call | 1 to 1 relationship |
| start time | time that the method call occurred | simple |
| end time | time that the return from the method occurred | simple |
| base time | time spend in this method call | simple |
| cumulative time | cumulative time in this method call | summary |
| thread | the thread in which the method call occurred | 1 to 1 relationship |
| caller | the calling invocation | 1 to many relationship |
| callees | invocations called by this invocation | 1 to many relationship |
| indirect callers | transitive closure of the 'caller' relationship | 1 to many relationship |
| indirect callees | transitive closure of the 'callees' relationship | 1 to many relationship |

Fig. 5

Recasting rules

| Rules | Comments | Step |
|---|---|---|
| filter classes by package | applies only to classes in each package proper – does not take into account subpackages | 2 |
| filter methods by class | | 3 |
| filter instances by class | | 3 |
| filter invocations by instance | include only invocations where the target object is in the slice | 4 |
| filter invocations by method | include only invocations where the method is in the slice | |
| filter invocations by thread | | 2 |
| include callees | add direct and indirect callers of invocations, subject only to membership in parent slice | 5 |
| include callers | add direct and indirect callees of invocations, subject only to membership in parent slice | 5 |
| include referees | add direct and indirect referees of instances, subject only to membership in parent slice | 5 |
| include referands | add direct and indirect callers of instances, subject only to membership in parent slice | 5 |
| apply filtering rules only to invocations | undo the filtering of classes, methods, and instances, caused by the rules in steps 2 through 4.<br><br>the purpose of this rule is to be able to easily use package, class, method, and object filtering to study execution time a. | 6 |
| apply filtering rules only to instances | undo the filtering of classes caused by the rules in steps 2 through 4.<br><br>the purpose os this rule is to be able to easily use package and class filtering to study memory resource usage. | 6 |

Fig. 6

Execution Slice Membership algorithm

Compute membership in execution slice S:

Let evaluateQuery(E, e, S) represent the result of evaluating the query in execution slice S for elements of the entity E over the element e. (Note that e will always be of type E.)

// Determine membership of threads, based on the thread query and membership in
// the parent execution
// slice
For each JThread t
if t is a member of the parent of S
    if evaluateQuery(Thread, t, S)
        mark t as a member of S
else
    mark t as not a member of S // Determine membership of packages, based on the package query and membership in the parent
// execution slice
For each JPackage p
    if p is a member of the parent of S
        if evaluateQuery(Thread, p, S)
            mark p as a member of S
else
        mark p as not a member of S // Determine membership of classes, based on the class query, membership in the
// parent execution slice, and optionally the rule *filter classes by package*

For each JClass c
    if c is a member of the parent of S
        if the rule *filter classes by package* is disabled or the package of c
            is a member of S
            if evaluateQuery(Package, c, S)
                mark c as a member of S
    else
        mark c as not a member of S // Determine membership of methods, based on the method query, membership in
// the parent execution slice, and optionally the rule *filter methods by class*
For each JMethod m
if m is a member of the parent of S
    if the rule *filter methods by class* is disabled or the class of m is a member of S
        if evaluateQuery(Method, m, S)
            mark m as a member of S
    else
        mark m as not a member of S

Fig. 9b

// Determine membership of instances, based on the method query, membership in
// the parent execution slice, and optionally the rule *filter instances by class*
For each JInstance o
    if o is a member of the parent of S
        if the rule *filter instances by class* is disabled or the class of o is a member of
S
            if evaluateQuery(Instance, o, S)
                mark o as a member of S
    else
        mark o as not a member of S

// Determine membership of invocations, based on the invocation query,
// membership in the parent execution slice, and optionally the rule *filter invocations*
// *by method, filter invocations by instance, filter invocations by thread, include*
// *callees, and include callers*
For each JThread *t*
    if *root* be the root invocation of the call tree of *t*
    if *root* is not null
        if the rule *filter instances by thread* is disabled or *t* is a member of S
            computeInvocationMembership(*root, S, include_some*)
        else
            computeInvocationMembership(*root, S, include_none*)

//Undo the effects of some of the rules already applied, if the rule apply *filtering rules*
// *only* to invocations or the rule *apply filtering rules only to instances* is enabled
//
If the rule *apply filtering rules only to invocations* is enabled or
   the rule *apply filtering rules only to instances* is enabled
        For each JPackage *p*
            if *p* is a member of the parent of S
                mark *p* as a member of S
            else
                mark *p* as not a member of S For each JClass *c*
            if *c* is a member of the parent of S
                mark *c* as a member of S
            else
                mark *c* as not a member of S If the rule *apply filtering rules only to invocations* is enabled
        For each *JMethod m*
            if *m* is a member of the parent of S
                mark *m* as a member of S
            else
                mark *m* as not a member of S

Fig. 10b

If the rule *apply filtering rules only to instances* is enabled
    For each *JInstance o*
        if *o* is a member of the parent of *S*
            mark *o* as a member of *S*
        else
            mark *o* as not a member of *S*

Fig. 11

Algorithm to compute membership of invocations in an execution slice

*computeinvocationMembership(i, S, action)*
    Recursively evaluate and save the membership information for a call tree.

Parameters:
    Jinvocation, *i*, the root of the call tree to work with
    Execution slice *S*
An *action*, which may take on the following values:
- *include_none*: mark all Jinvocations of the subtree as not members of *S*
- *include_all*: mark all Jinvocations of the subtree being members of *S*, subject to the membership of each in the parent of *S*
- *include_some*: use additional criteria to determine the membership of each Jinvocation of the subtree in *S*

Returns:
returns *include_callers_of_invocation*, with the following meaning:
    *true* if and only if *i* is a member of *S*, and it's a member for reasons that would cause the rule *include callers* to include the caller of *i* in *S*
    *false* otherwise

Steps:

//Compute *i*'s membership on its own merit (i.e. not due to the rules *include callees* or *include callers*)
if *action* is *include_some*
if *i* is a member of the parent of *S*
    if the rule *filter invocations by instance* is disabled or
        the target instance of *i* is a member of *S*
            if the rule *filter invocations by method* is disabled or
                the method of *i* is a member of *S*
                      if evaluateQuery(invocations, *i*, *S*)
                          set *isMemberitself* = *true* else
    set *isMemberitself* = *false*

// Compute the membership information for the callees or *i*
if *isMemberitself* is *true* and the rule *include callees* is enabled
    set *calleeAction* = *include_all*
else
    set *calleeAction* = *action*
set *someCalleeisMember* = *false*
For each JInvocation of a callee of
    set *calleeisMember* = computeinvocationMembership(*i*, *S*, *calleeAction*)
    if *calleeisMember*'s *true*
        set *someCalleeisMember* = *true*

Fig. 12b

// Compute and save membership information for *i*, taking into account the rules
// *include callees* and *include callers* if necessary
if action is *include_all*
    if *i* is a member of the parent of S
        set *isMemberBecauseOfCaller* = true
else
    set *isMemberBecause OfCaller* = false
if some *CalleeIsMember*
    if the rule *include callers* is in effect
        set *isMemberBecause OfCallee* = true
else
    set *isMemberBecauseOfCallee* = false
if *isMemberitself* or *isMemberBecauseOfCallee* of *isMemberBecauseofCaller*
    mark *i* as a member of S // Pass information up for computing the membership of the caller of *i*
if *isMemberitself* or *isMembeBecauseofCallee*
    return *true*
else
    return *false*

Fig. 13

Algorithm to compute and save stored summary attributes

We denote the value of an attribute *a* for an element *e* relative to execution slice S as
*e, a(S)*.

Parameters:
    And execution slice, S

Steps:

// Reset all stored summary attributes
For each element e in the database
    for each stored summary attribute a
        set e, a(S) = 0

//Compute and save all stored summary attributes derived from invocations.
// except for summary attributes of packages other than total cumulative time
For each JThread t
    let root be the root invocation of the call tree of t
        if root is not null
            set t.total_cumulative_time(S) = computeStoredSummaryAttribute(root.S)

//Compute and save all stored summary attributes derived from instances,
// except for summary attributes of packages
For each Jinstance o
    Set o = JClass of o
    if o is a member of S
        for each attribute a from the set
            (number_of_instances, number_of_live_instances,
            total_size_of_instances, total_size_of_live_instances)
            increment c,a(S) by o,a(S)

// Aggregate class information to packages, except for total cumulative time
For each JClass c
        set p = the JPackage that directly contains c
        while p is not null
            for each attribute a from the set
                {number_of_calls_instances, total_base_time_instances.
                number_of_calls_methods, total_base_time_methods.
                number_of_instances, number_of_live_instances.
                total_size_of_instances, total_size_of_live_instances}
                increment p,a(S) by p,a(S)
    set p = the containing JPackage of b

Fig. 14b

Algorithm to compute and save stored summary attributes derived from invocations
*computeStoredSummaryAttributes(i,S)*
    Update stored summary attributes that are based on the tree of invocations
    rooted at JInvocation *i*, in Execution slice *S*. Returns the total cumulative
time
    for *i* relative to *S*

Steps:

We denote a counter keeping track of invocations in progress for computing
attribute *a* on element *e* as *e.counter(a)*.

set *o, oc, m, mc, t* to, respectively, the target instance, target instance class,
method, method class, and thread of *i*

// Mark that a computation is in progress for this invocation
increment by 1:
    *o.counter(total_cumulative_time),*
    *m.counter(total_cumulative_time),*
*incrementClassAndPackageCounters(oc, total_cumulative_time_instances)*
*incrementClassAndPackageCounters(mc, total_cumulative_time_methods)* if *i* is a member of *S*
    // Add this invocation to the *number_of_calls and total_base_time* attributes
    //
    increment the following attribute values by 1:
        *t.number_of_calls(S),*
        *o.number_of_calls(S), m.number_of_calls(S),*
        *oc.number_of_calls_instances(S), mc.number_of_calls_methods(S)* increment the following attribute values by the base time in *i*:
        *t.total_base_time(S),*
        *o.total_base_time(S), m.total_base_time(S),*
        *oc.total_base_time_instances(S), mc.total_base_time_methods(S)*

```
// Subtract the callees' time not in the Execution slice from the time of this
// invocation
//
set cumulative_time_in_slice = elapsed time in i
for each callee callee of i
    cumulative_time_in_slice= cumulative_time_in_slice-
            (elapsed time of callee-computeStoredSummary
Attributes(callee,Si)

else// i is not a member of S
    // Add up the callees' time in the execution slice
    //
    set cumulative_time_n_slice = i)
    for each callee callee of i
        cumulative_time_n_slice = cumulative_time_n_slice -
                            compareStoredSummaryAttributes(callee, S)
```

Fig. 15b

```
// Add this invocation's cumulative time in the execution slice to the total time
attributes
// for various groupings (by instance, method, etc.) as long as there is no
computation
// already in progress for that grouping
//
if o.counter(total_cumulative_time) equals 1
    increment o.total_cumulative_time(S) by cumulative_time_in_slice
if m.counter(total_cumulative_time) equals 1
    increment m.total_cumulative_time(S) by cumulative_time_in_slice
incrementClassAndPackageCumulativeTime(cc, total_cumulative_time_instances S,
                            cumulative_time_in_slice
```

*incrementClassAndPackageCumulativeTime(mc, total_cumulative_time_method, S, cumulative_time_in_slice*

// Mark that a computation is no longeri n progress for this invocation
decrement by 1:
      *o.counter(total_cumulative_time),*
      *m.counter(total_cumulative_time)*
*decrementClassAndPackageCounters(oc, total_cumulative_time_instances)*
*decrementClassAndPackageCounters(mc, total_cumulative_time_methods)* return *cumulative_time_in_slice*

---

*incrementClassAndPackageCounters(classOrPackage, a)*
    inform a class and/or packages (recursively up the containment hierarachy) that an invocation is being processed for a computation on an attribute *a* grouped by *classOrPackage* (a JClass or JPackage)

Steps:

increment *classOrPackage.counter(a)* by 1
if *classOrPackage.counter(a)* ==1
    set *p* = containing JPackage of *classOrPackage*
    if *p* is not null
        *incrementClassAndPackageCounters(p, a)*

*decrementClassAndPackageCounters(classOrPackage, a)*
    inform a class and/or packages (recursively up the containment hierarachy) that an invocation is no longer being processed for a computation on an attribute *a* grouped by *classOrPackage* (a JClass or JPackage)

Steps:

decrement *classOrPackage.counter(a)* by 1
if *classOrPackage.counter(a)* == 0
    set *p* = containing JPackage of *classOrPackage*
    if *p* is not null
        *decrementClassAndPackageCounters(p, a)*

Fig. 16c

*incrementClassAndPackageCumulativeTime(classOrPackage, a, S, increment)*
    add *increment* representing cumulative time of an invocation in an execution
    slice, to a class and/or packages (recursively up the containment hierarchy).
    *classOrPackage* is a JClass or JPackage by which the computation is
    grouped, and *a* is the summary attribute being computed.

Steps:

If *classOrPackage.counter(a)* == 1
    increment *classOrPackage.a(S)*
    set *p* = containing JPackage of *classOrPackage*
    if *p* is not null
        *incrementClassAndPackageCumulativeTime(p, a, S, increment)*

Fig. 17

METHODS FOR ANALYZING DYNAMIC PROGRAM BEHAVIOR USING USER-DEFINED CLASSIFICATIONS OF AN EXECUTION TRACE

BACKGROUND OF THE INVENTION

1. Field of Invention

This invention generally relates to methods for analyzing the execution behavior of software programs. More specifically the present invention relates to methods embodied in software tools by which a user may interactively explore information gathered during a program's execution.

2. Prior Art

Given only a program's source code (its static description), the behavior of the program as it runs (its dynamic behavior) can often be very difficult to predict. Programs often run incorrectly, more slowly, or use more system resources than a programmer expected. Diagnosing these problems, which requires understanding the dynamic behavior of the program, can be a difficult task even for the most experienced programmer.

Various categories of software tools, such as profilers, debuggers, and program visualizers allow the user to study a program's behavior in different ways. These tools are helpful at times, but they are often ill-suited to both the complexity of the program being analyzed and to the nature of the analysis process. As a result, programmers work slowly with existing tools, construct their own ad hoc tracing schemes in order to analyze a specific problem, or just work "in the dark" much of the time.

Dynamic behavior may be studied by collecting a program trace for analysis, containing information about events that occurred and resources used during the program run. The analysis may be done after the run has completed, or it may be integrated with the collection process.

Even relatively simple programs will often involve a lot of internal activity, and more typical programs can generate extremely large and complex traces that can be overwhelming for the analyst to study. As in other fields where large amounts of information are studied, analysis tools must provide ways to organize the information: to filter out irrelevant information, and to group related information so that fewer, higher-level units may be studied. These organizing abstractions may then be used to compute summary measurements, or for structuring or rendering elements in visualizations.

Because of the complexity of programs, a central problem when analyzing their behavior is that information of interest is often intertwined with unrelated information. The problem may manifest itself as visual clutter in detailed graphical views, or as numerical summaries skewed by the inclusion of irrelevant information. In either case, key information needed for analysis can remain hidden without the right organization. The choice of organizing abstraction at each step in an analysis is crucial for enabling the user to work with the information productively.

A number of organizing abstractions are currently provided by various tools, and have proven useful for many situations. These include organization based on static units, for example threads, classes, methods, and instances when analyzing a Java program, and certain types of organization based on dynamic information, such as call trees and patterns. There are many important cases, however, where the information of interest does not line up with these organizational schemes, and the most appropriate organization will be based on more complex combinations of static and dynamic criteria. Here are a few examples:

1. The user would like to study a functional aspect of the program, not represented formally in the static structure of the program, involving a few methods from a number of different classes.
2. The user would like to contrast the behavior of the slowest 10% of invocations of a given method with the fastest 10%, to understand the difference.
3. The user would like to study only the instances of a given class that were used in a particular way, such as all the Java Vectors that were created in the course of a specific sequence of method calls.

In general, it is necessary to provide the user the flexibility to filter and group the information as needed for a particular problem being studied. This must be in addition to other, more fixed, organizational schemes, which are also useful. Note that flexibility in organizing the information, while enabling the analysis, potentially introduces additional usability difficulties in specifying complex filtering and grouping criteria. It is important to address these difficulties as well.

In addition to the complexity of the data being studied, the analysis process is often a long and unpredictable process. The user may or may not know in advance what questions he or she needs answered. The user is just as likely to be searching for clues that will give insight into a problem as trying to obtain answers to precise questions to verify a hypothesis. It is therefore essential for an analysis tool to support many styles of analysis. The user may, for example, use graphical views to gain an overall understanding of the flow of events, discover patterns, or spot anomalies. At other times the user may need to make quantitative comparisons of resource usage. User-defined filtering and grouping units must be usable for all of these types of study.

Many different types of views will usually be needed within a single study, in order to study a problem from different angles. The user must be able to maintain a consistent context across these various views. This context would include not just different presentations of the same information, but different types of information as well. For example, the user may start by identifying a certain group of instances as an aspect of the execution to study. In one view, the user may then want to see how much time each thread spends on activity related to these instances, and in another view see the detailed sequence of method calls against the instances to understand when and how they are used. It is important that the user be able to maintain a consistent context while working with different types of information. It is important that the user be able to move from one type of information to another, without having to restate complex filtering and grouping criteria.

Analysis is often a lengthy, experimental process. At a given stage, the user may have a particular focus of study and an organization of the information based on a hypothesis on where the problem may lie. The user may then study the problem within this framework, using various views over various types of information, as discussed above. In the process, the user may make discoveries that will change the course of the investigation. The user may decide, for example, to refine the focus of study, or organize the information differently based on new information. The user may also want to try out a hypothesis, with the ability to backtrack to an earlier stage of analysis if the hypothesis is incorrect. The user may also want to try out multiple alternative analysis paths simultaneously focusing on different aspects or using different organizational schemes and compare the results. In general, it would be helpful for an analysis tool to maintain multiple working contexts for the user, to help structure the larger analysis process.

SUMMARY OF THE INVENTION

An object of the present invention is to enable the analysis of dynamic program behavior for problem diagnosis.

Another object of this invention is to provide a method that enables the analysis of dynamic program behavior for problem diagnosis, and that is also applicable to other applications of dynamic program behavior analysis, such as program maintenance, testing, and program characterization.

These and other objectives are attained with a method and system for analyzing dynamic behavior of a computer program using user-defined classifications of an execution trace. The method comprises the step of forming a database describing the executions of the program. The database includes stat information obtained from the program source, and dynamic information describing particular executions of the program. The database is structured into entities, and each of the entities is comprised of a single type of information about the program execution. Each entity is comprised of elements representing individual program elements of said single type, and each element has attributes with values describing the element. The database is augmented by classifying every element of the database as a member of zero or more user defined execution slices; and dynamic behavior of the program is analyzed using the execution slices.

The preferred embodiment of the invention is for use with a database describing a program's execution, containing both static information (obtainable from the program source) and dynamic information (describing a particular execution of the program). The database is structured into entities, each containing a single type of information about the program execution (for example threads, classes, method invocations). Each entity consists of elements representing the individual program elements of that type (for example, an element may represent an individual thread, class, or method invocation). Each element has attributes with values that describe that element of the program execution. Some attributes are relationship attributes, whose values relate an element to one or many other elements. Some attributes are summary attributes, whose values are aggregations of attribute values from a number of other elements.

In accordance with the present invention, the user may augment the database by classifying each element of the database as a member of zero or more user-defined execution slices. Each execution slice is based on an arbitrary combination of static and dynamic criteria, and represents an aspect of interest to the user for analysis.

The set of execution slices serves as an additional dimension with which to access information in the database, independent of the predefined entity structure. Each execution slice may thus be used as a lens through which to access the entire database. This mediated view of the database will have the following properties:

1. the structure (of entities and attributes, including relationship attributes) will be identical to the original database structure
2. only elements that are members of the given execution slice will be present
3. the values of many-valued relationship attributes will vary depending upon the given execution slice
4. the values of summary attributes will vary depending upon the given execution slice.

In effect, summary attributes become multidimensional summary attributes, summarizing information by both an element of the database and an execution slice.

Hierarchy of Execution Slices

Execution slices may be arranged as a hierarchy, where the root execution slice contains every element in the database describing the program execution. The elements of each execution slice are a subset of the elements of its parent execution slice.

Analysis Techniques Using Execution Slices

Execution slices may be used to filter the elements presented in views. Execution slices may also be used to visually classify the elements presented in a view. Execution slices may also be used to filter the information used as the basis for summary computations. In addition, execution slices may be used to perform comparisons of multidimensional summary information.

An execution slice (the base) and its immediate child slices in the hierarchy (the subsets) may be used together in a single view to provide a combination of filtering and visual classification. An execution slice (the base) and its immediate child slices in the hierarchy (the subsets) may be used together in a single view to provide comparison of multi-dimensional summary information of the subsets against the base.

Task-specific Techniques for Ease of Use

Recasting rules are introduced to simplify the specification of execution slices. Execution slices are defined by a combination of filtering queries and recasting rules. For a given execution slice, a filtering query on each entity specifies which elements of that entity will be a member of the execution slice. Recasting rules interpret these queries to cause additional related elements to be included in or excluded from the execution slice.

In addition to allowing the user to specify the query criteria directly, we allow the user to define a set of execution slices by interactively selecting elements of the database. Alternatively, the user may define a set of execution slices by selecting an attribute. The values of the attribute will be used as the basis for classification into a set of execution slices.

Structuring the Analysis Process

Also disclosed herein is a method for the user to structure and manage a lengthy, experimental analysis process using execution slices. A workspace may be defined consisting of an execution slice (the base) and its immediate children (subsets). Using a workspace, the user can perform an analysis using any number of views, and they will share a consistent information context of these base and subset slices. The base slice is used to set the overall scope by filtering out irrelevant information in each of the workspace's views, while the subset slices are groupings of information within the limited scope of the base slice.

The user may work with multiple workspaces simultaneously, allowing multiple experimental contexts to be maintained.

Navigation Using Execution Slices

The user may select a number of elements in one view, and navigate to other views to study related elements. A temporary execution slice is used to automatically recast the information for presentation in views over related information.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIGS. 2–5 identify and describe various entities and attributes that may be used in the practice of this invention.

FIG. 6 lists a set of recasting rules that may be used in the present invention.

FIGS. 9, 10 and 11 show an execution slice membership algorithm.

FIGS. 12 and 13 show an algorithm to compute membership of invocations in an execution slice.

FIGS. 14–17 show an algorithm to compute and save stored summary attributes.

DETAILED DESCRIPTION OF THE PREFERRED EMBODIMENTS

The Java program being analyzed (the target program) is run using a specially instrumented Java Virtual Machine (JVM) which produces trace information. The user studies the program's behavior using a visualizer, which loads the trace information and presents to the user various interactive views for exploring the information. The trace information may be saved in a file for later analysis, or it may be sent over a live connection to a visualizer for analysis while the target program is running. With respect to the functionality described herein, the operation of the visualizer is identical in either case.

The trace consists of two broad types of information: event traces and memory snapshots. An event trace contains method call and return, class load and unload, object creation and garbage collection, and thread creation and termination information. A memory snapshot contains information about the existence and identity of objects and the references among them, at a given moment in time chosen by the user. The user has control over generating only a subset of the trace information for a given run of the target program.

As the information is loaded into the visualizer, it is converted into a database of information that is used in the various views and analysis features of the visualizer. The conceptual structure of the database, the data model, is described below. The following terminology is used herein to describe the database:

An element describes a single element of the target program execution, such as a Java class, class instance, method, method invocation, thread, or package.

An entity is a collection of the same type of element (i.e. all having the same attributes).

An attribute property of an element. For example, "class name" is an attribute of an element describing a Java class. Each element will have multiple attributes.

An attribute value is the value of an attribute for a specific element.

An attribute may be:

A relationship attribute, referring to one or many related elements (known as a 1-to-1 or 1-to-many relationship, respectively). The elements for a given relationship attribute will all be from the same entity.

A simple attribute, gathered directly from the trace, or computed from such information from a number of elements related via 1-1 relationships.

A summary attribute, computed by aggregating information from a number of elements related directly or indirectly via 1-many relationships.

Figure 1:
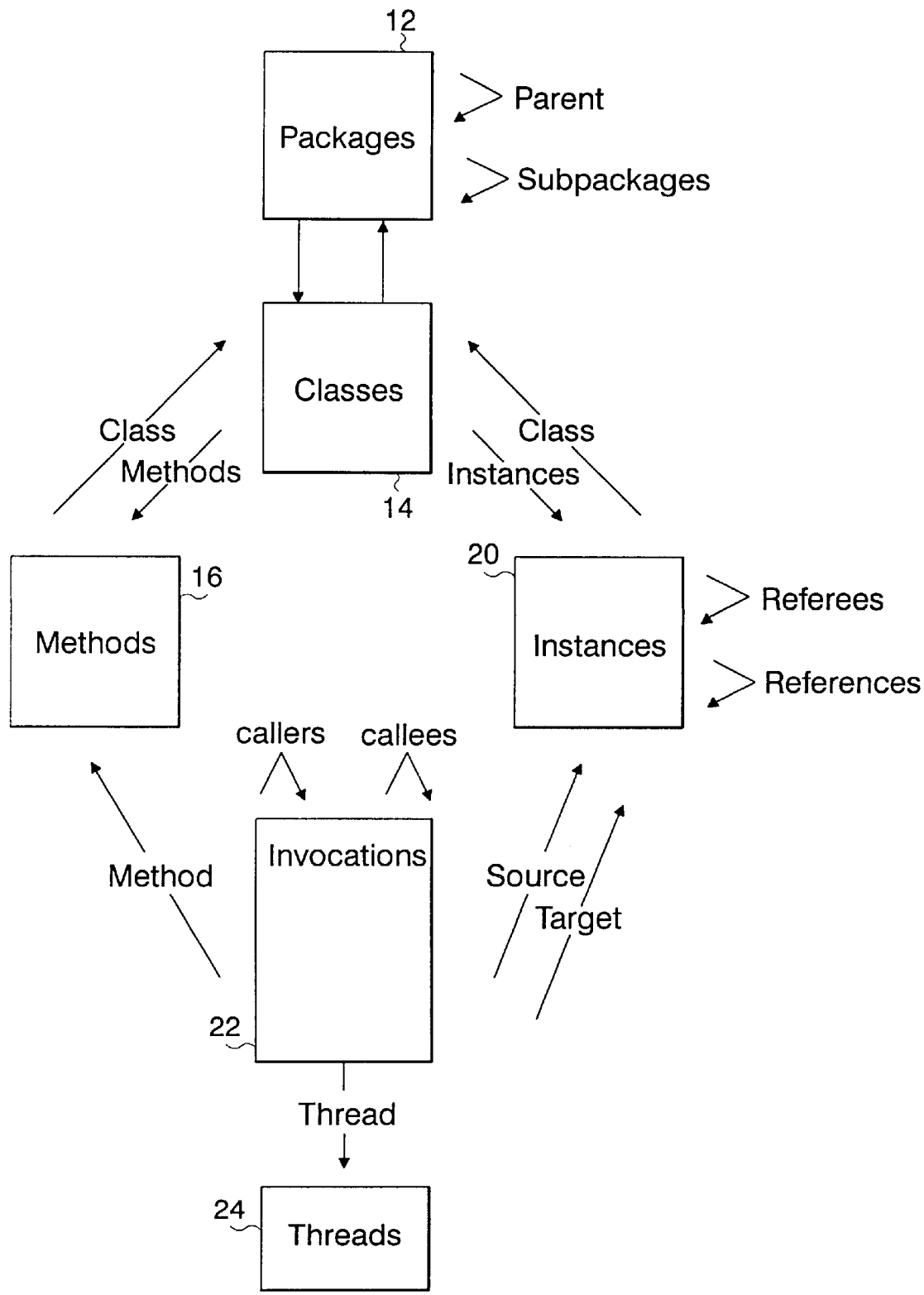
FIG. 1 is a diagram of the data model used in a preferred embodiment of the invention.

FIG. 1 shows a diagram of the data model. Entities are drawn as rectangles and relationship attributes are shown as arrows. FIG. 1 shows package 12, classes 14, methods 16, instances 20, invocations 22, and threads 24. FIG. 2–5 describes the entities and attributes in detail. The following terms are used in describing summary attributes:

Base time of a method invocation is time just in that invocation, excluding anything it calls Cumulative time of a method invocation is the sum of time in that invocation and every invocation it calls Total base time is the sum of base time spent in a set of invocations Total cumulative time is the aggregate of cumulative time spent in a set of invocations. Note that this is not a strict sum of the cumulative times of the individual invocations, but rather it takes into account the fact that methods in the set may directly or indirectly call each other.

Execution Slices

An execution slice is a subset of the database containing zero or more elements of each entity. All information in the database may be accessed through the lens of a particular execution slice, as follows:

Any element of the database may be classified as being or not being a member of a given execution slice. Note that execution slices may overlap, i.e. each element may be a member of more than one execution slice.

Attributes of each element are evaluated relative to a given execution slice. The values of some attributes will depend upon the execution slice. These attributes are known as slice-dependent attributes; others as slice-independent attributes. Summary attributes and 1-to-many relationship attributes are slice-dependent; simple attributes and 1-to-1 relationship attributes are slice-independent.

The value of a 1-to-many relationship attribute relative to a given execution slice consists of the related elements which are also members of the given execution slice. For example, if S is an execution slice containing only methods that are constructors, then evaluating the attribute methods for a class, relative to S, will return all the constructors of that class.

The value of a summary attribute relative to a given execution slice is determined by aggregating only those elements which both contribute to the summary computation and are a member of the given execution slice. For example, if S is an execution slice containing only methods that are constructors, then evaluating the attribute number_of_calls for a thread, relative to S, will return the number of constructor calls made in that thread.

All of the execution slices in a visualizer session are arranged as a hierarchy. The execution slice at the root of the hierarchy contains all of the information collected from tracing the target program.

The content of an execution slice is determined as follows:

1. An execution slice contains a subset of the elements of its parent execution slice
2. the content of an execution slice is further restricted by the following:

Queries, one per entity, which define filtering criteria for the entity, based on static and dynamic attributes of this and related entities.

Recasting rules, which determine how the queries are extended over related information.

Note that an execution slice's content is determined by its queries and rules, but these concepts are not necessarily visible to the user defining the content of a particular execution slice.

Slices: Queries

A query specifies the filtering of the elements of a particular entity. A query is a Boolean expression that combines query expressions with the operators NOT, AND, OR, and grouping using parentheses.

Each query expression takes the following form:

<attribute> [<operator> <operands>]

where, <attribute> is any attribute of the entity associated with the query, the optional <operator> is an operator appropriate for the datatype of the attribute, and <operands> are determined by the <operator>.

The following are the operators appropriate for each type of attribute:

| Attribute datatype | Allowable operators |
| --- | --- |
| numeric (simple or summary) attribute | >, <, ==, <=, >=, !=, BETWEEN, IN |
| character string (simple) attribute | CONTAINS, ==, IN |
| boolean (simple) attribute | no operator |
| relationship attribute | IN, WHERE |

The following are the operands appropriate for each operator:

| Operator | Operand(s) |
| --- | --- |
| >, <, ==, <=, >=, !=, CONTAINS | single value |
| BETWEEN | low and high values |
| IN | list of values |
| WHERE | subquery |

A subquery takes the same form as a query, and may appear as the operand of a WHERE operator within a query expression over a relationship attribute. For a 1-to-1 relationship, the WHERE operator evaluates to true if the subquery evaluates to true for the single related element. For a 1-to-many relationship, the WHERE operator evalutes to true if the subquery evaluates to true for at least one of the related elements.

When a slice-dependent attribute (i.e. a summary attribute or a 1-to-many relationship attribute) appears in a query expression, its value is determined using the parent slice of the slice in which the query appears.

Slices: Recasting Rules

Recasting rules, shown in FIG. 6 determine how the filtering criteria of queries on each entity will be applied to related information in that and other entities. The purpose of these rules is to allow the user to specify filtering criteria simply, and have the system fill out more detail of the criteria, for common analysis tasks. Some of these rules are restrictive rules, further filtering out information, while others are inclusive rules, causing additional elements to be added to the execution slice. The system provides a fixed set of rules. Each rule may be individually enabled or disabled by the user for each execution slice.

The recasting rules interact with each other and with the query evaluation. In this description, we label rules and query evaluation with step numbers, to illustrate the order of evaluation required to achieve the proper result. Note that these are functional but not necessarily actual steps; the implementation optimizes the process in various ways. Evaluation of queries on each entity is step 1.

Workspaces

A workspace may be defined over an execution slice (known as the workspace base) and its immediate children (subsets) in the hierarchy of execution slices. Using a workspace, the user can perform an analysis using any number of views, and they will all share a consistent information context of base and subset execution Slices. The user may work with multiple workspaces simultaneously. By default, the visualizer creates an initial workspace whose base slice contains the entire database of trace information.

Preferred Embodiment: Usage

Slice Specification Techniques

We provide various techniques for specifying execution slices, with the goal of allowing the user great flexibility in their definition in a way that is easy to use for common analysis tasks. Execution slices are defined by a combination of filtering queries and recasting rules. The recasting rules take the place of potentially complex query criteria for the most common cases. This is particularly important since a single execution slice will span all types of information (i.e. all the entities) in the database. The recasting rules help the user study different types of information as they pertain to the execution slice without having to restate the query criteria over each type of information.

We provide the user a fixed set of predefined recasting rules. When the user first creates an execution slice, a subset of the rules is enabled for that execution slice by default. The user may adjust the specification of the execution slice by enabling or disabling individual rules.

The query portion of the definition may be specified in one of three ways. The above discussion of recasting rules applies in all three cases.

One way to specify an execution slice is to interactively select elements of interest from any of the views. The system will automatically construct query criteria that match the selection. Static structural elements such as classes and methods, as well as dynamic elements such as individual instances or method invocations may be chosen as the basis for an execution slice. Elements may also be selected for exclusion from an execution slice. This is useful for filtering out cases known to be outliers. For example, if we are studying a method that is invoked many times, we may want to exclude the first invocation if it is much more expensive due to initialization costs.

Attribute values can be useful as dimensions for categorizing information. For example, to analyze a method with many repeated invocations, we can categorize each invocation based on its base time as being slow, medium, or fast. If we create an execution slice for each of these categories, we can then compare the slow and fast cases from various angles to understand what is causing the slow cases. Similarly, to diagnose a complex memory leak in a long-running application, we can classify the objects into a number of distinct periods by creation time. We could then define an execution slice for each of these groups of objects, to measure the memory used per class during each time period. To define a set of execution slices based on values of an attribute, the user may select the attribute, and the system will group the values of the attribute into buckets. The user is presented with a number of options to control how the buckets are determined. The system will automatically create an execution slice for each bucket, with query criteria that correspond to that bucket.

To specify more complex criteria the user may specify the queries directly using an interactive query editor. The user may create new execution slices from scratch using this editor, or use it to fine tune the filtering criteria of execution slices created in other ways. Note that the query editor does requires more knowledge of the data model and some database concepts than the other specification techniques. However, since the recasting rules still apply, the specification is still much simpler than it would have been with a pure query-based approach.

Analysis Techniques Using Execution Slices

Execution slices may be used in views in a number of ways: for filtering information, for visual classification of information, and as a basis for multidimensional computations, as we describe below. All of these techniques may be used, separately or in combination, in various ways in different types of views to allow the user to perform higher-level analysis tasks, such as making visual and numerical comparisons, spotting patterns, trends and exceptions, discovering correlations, and verifying hypotheses.

An execution slice may be used in views to filter the elements which will appear. For example, in a tabular view where each row shows information about a class and each column is an attribute of that class, an execution slice that contains only a few classes may be used to filter this view to show only the rows for those particular classes. The purpose of filtering elements is to remove extraneous information so the user can focus on a particular set of information. In some views, it makes sense to still render the elements that are filtered out, but render them in such a way (for example, in a faintly visible color) that they don't distract the viewer from studying the elements of interest.

An execution slice may also be used to filter the information on which summary computations are based. For example, a view showing information about the total cumulative time spent in method calls on each instance may compute this attribute relative to a particular execution slice.

A set of execution slices may be used to visually classify information. For example, given a set of execution slices representing different functional areas of a program, a graphical view showing the detailed sequence of method invocations may color the invocations based on membership of each invocation in one or more execution slices. Note that coloring is only one technique for visually classifying information. Other visual aspects of a view, such as the placement of graphical objects in a layout, could be based on execution slice membership as well.

A set of execution slices may be used to display multi-dimensional summary attributes. For example, in a tabular view where each row shows a class, and each column represents one of the execution slices, each cell may show the value of an attribute for a particular class relative to a particular execution slice. This allows the user to compare measurements across both user-defined and predefined dimensions.

In a view containing a base execution slice and a number of subset execution slices which are children of the base in the execution slice hierarchy, we may combine the above techniques in a number of ways. We may use the base for filtering elements which appear in the view, and visual classify the remaining elements according to their membership in the base and subset execution slices. This allows the user to filter out irrelevant information, and see the remaining information classified according to user-defined groupings.

We may also present quantitative information in a view containing a base execution slice and subset execution slices, as follows. The view may show multidimensional summary attributes computed relative to the base and each of the subset slices. This allows the user to filter out extraneous information and compare the remaining information not just among the user-defined groupings, but of each grouping against the base. For a given element, such a view may show a summary attribute value relative to one of the subsets as an absolute number or as a percentage of the corresponding value computed relative to the base.

Analysis With Multiple Views

The user may work with multiple views simultaneously, where the views may show the information in different ways, show different elements, or show different types of elements. All of these views may use a common set of execution slices, in the various ways described above, allowing the user to study a set of user-defined aspects of the program execution from various angles.

The user may interactively select a set of elements in one view, and "drill down" to another view of related information. The system automatically constructs an execution slice that recasts the selected information into its new form. This execution slice is automatically used as the basis for filtering elements in the new view.

Supporting the Larger Analysis Process

Program analysis can be an iterative, experimental process. We introduce workspaces to explicitly address the needs of this larger process. A workspace allows the user to set up a filtering and grouping framework for a given stage of analysis. This framework may then be used to explore many aspects of the program execution, without requiring the user to restate the framework in each view. A workspace is composed of a base execution slice establishing the scope of the study, a set of execution slices which are subsets of this base in the hierarchy of execution slices, and any number of views which may make use of these execution slices. The workspace also provides consistent visual cues for the execution slices across multiple views, by assigning each execution slice a color for its use across all views in the workspace.

The system allows multiple workspaces to be active concurrently, supporting a number of common analysis scenarios. One such scenario is progressive refinement, where the user is iteratively narrowing a problem down to a smaller and smaller area that appears to be the likely cause. This can be an experimental process in which the user may need to backtrack. Workspaces may be used to save the state at each stage of refinement. An important special case of progressive refinement is where the user has created execution slices grouping information according to alternative hypotheses about where a problem might lie. To study one of these areas in more depth, the user can open a new workspace whose base is one of these execution slices. The user could then continue to break this area of activity down along some other lines by defining execution slices relative to this new workspace's base.

In another scenario, the user may not know in advance what the right organization of information is that will illuminate the cause of a problem. He or she may want to explore multiple hypotheses simultaneously, and compare results of the same information analyzed along different lines, using views from two different workspaces.

IMPLEMENTATION

Figure 7:
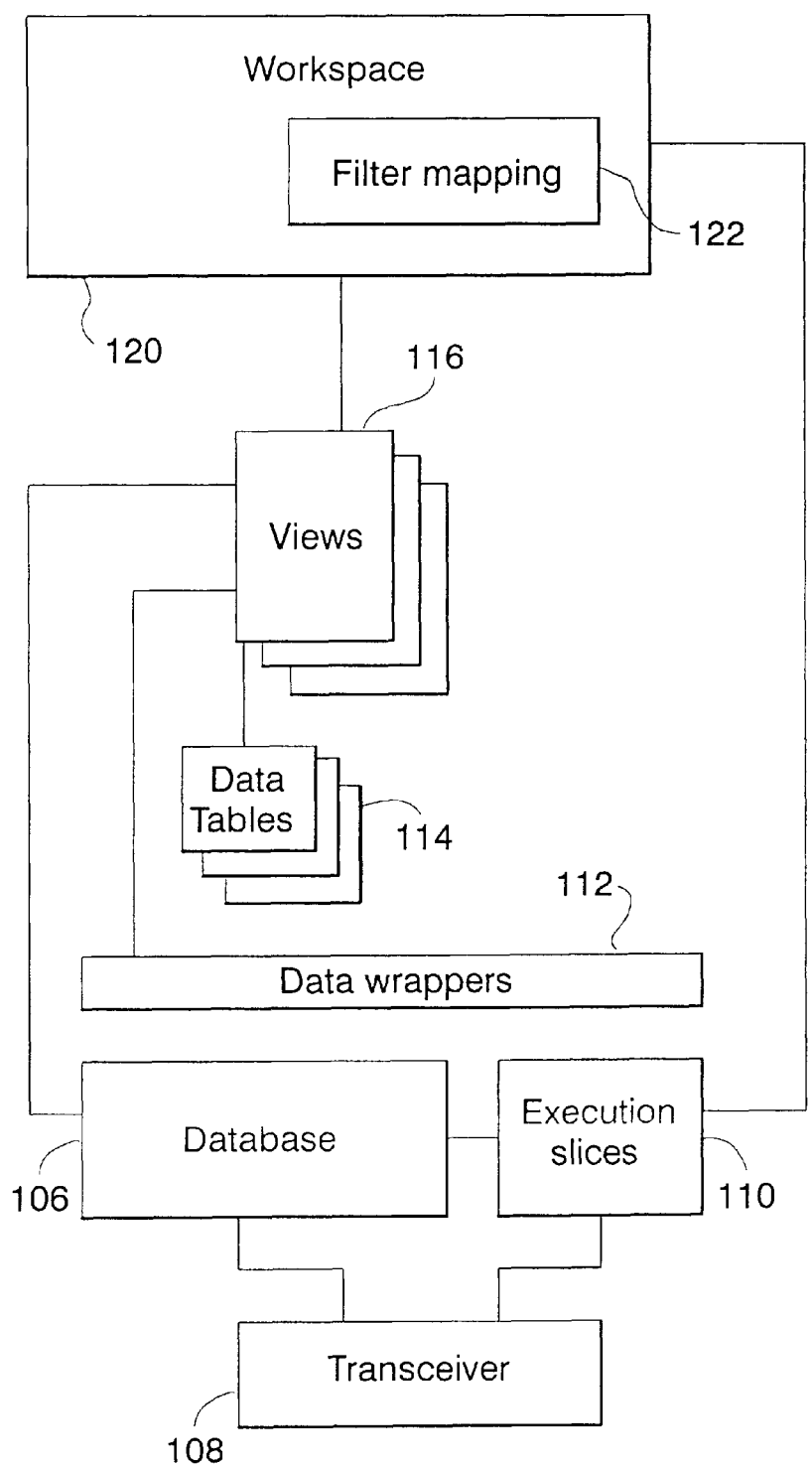
FIG. 7 illustrates the architecture of a visualizer that may be used in this invention.

The visualizer is built entirely in Java. FIG. 7 shows the architecture of the system 100, identifying major areas of functionality, each comprised of various components. The major areas of functionality of the visualizer are discussed below.

A system-wide event notification mechanism handles some of the communication among components. A component may broadcast any type of event, and may register to receive specific types of events.

The transceiver 104 reads the trace information from a file, or from a live connection to a JVM running the target program. The transceiver parses the trace information and issues calls and events which cause the database 106 to be populated.

The database 106 is a custom-designed in-memory database of program information. Each entity in the data model is represented as a Java class, and each element in the database is represented as a Java object of one of these classes. Herein, we refer to each of these Java classes by prepending a "J" to the type of element, e.g. JThread is the class representing a target program thread. Each adheres to the data interface, providing the following functions:

1. storage and retrieval of execution slice 110 membership information for each object,
2. access to a data wrapper 112 formalizing access to the objects of the class (see below)

Each of the database classes provides for either storage or on-demand ("lazy") evaluation of its attribute values. Relationship attributes are represented as single Java references for 1-1 relationships, or as a set of Java references for 1-n relationships. Relationship attributes for the root execution slice, representing the original trace, are stored explicitly in the database objects. Slice-dependent evaluation of 1-n relationship attributes is performed on demand; these values are not stored in the database.

There is a thin data wrapper class for each entity, allowing formal database-style access to Java objects. The data wrappers enable dynamic access to attributes for such purposes as query evaluation, presentation, and sorting. Each attribute is assigned a unique identifier, a constant determined at compile time of the visualizer. At run time this identifier may be used to obtain description information about an attribute, such as its name, its Java datatype, whether it is slice-dependent, and whether it should be cached by higher levels because its value is expensive to retrieve. An attribute identifier is also used to obtain an attribute value for a given element relative to a given execution slice. Note that this approach does not rely on Java reflection or introspection mechanisms, and therefore avoids their performance cost. Note also that there are many features of the visualizer that do not require formal access to the data; these features access the database objects' Java methods directly.

The execution slices provide query evaluation, membership evaluation, and calculation of most summary attribute values (described in detail below). There is also a data wrapper for execution slices themselves, allowing the attributes of execution slices to be presented in various views as if the execution slices themselves were an entity.

Data tables 114 provide an intermediate level of data management needed by some of the views 116. A data table manages data from the database for a view in progress, and provides a programming interface to access the data as a set of rows (elements) and columns (attributes). Data tables provide:

1. row filtering, so a view may display a subset of an entity's elements,
2. row sorting, by arbitrary columns,
3. value caching, if the underlying attribute is expensive to retrieve,
4. flattening of combinations (slice-dependent attributes x execution slices) into a single dimension of columns Views 116 present the information to the user using various visualization techniques, and provide interaction, as well as navigation to other views. Views access information from data tables, from the data wrappers, and from the database classes directly.

Workspaces 120 maintain a consistent data context of a base and subset execution slices for a set of views. Each workspace has an associated filter mapping 122 that maintains consistent visual cues (i.e. names and colors) for representing the execution slices in each view in the workspace.

Execution Slices: Overview of Implementation

For a given execution slice, membership information and the values of most summary attributes are computed and saved for the entire database in a process known as validation, which is done before the execution slice can be used. This batch approach is desirable since many of the computations require traversal of all of the calling hierarchies in their entirety. This approach also matches typical usage, where a user will specify filtering and grouping criteria first and then interactively explore the information from many angles using various views.

Figure 8:
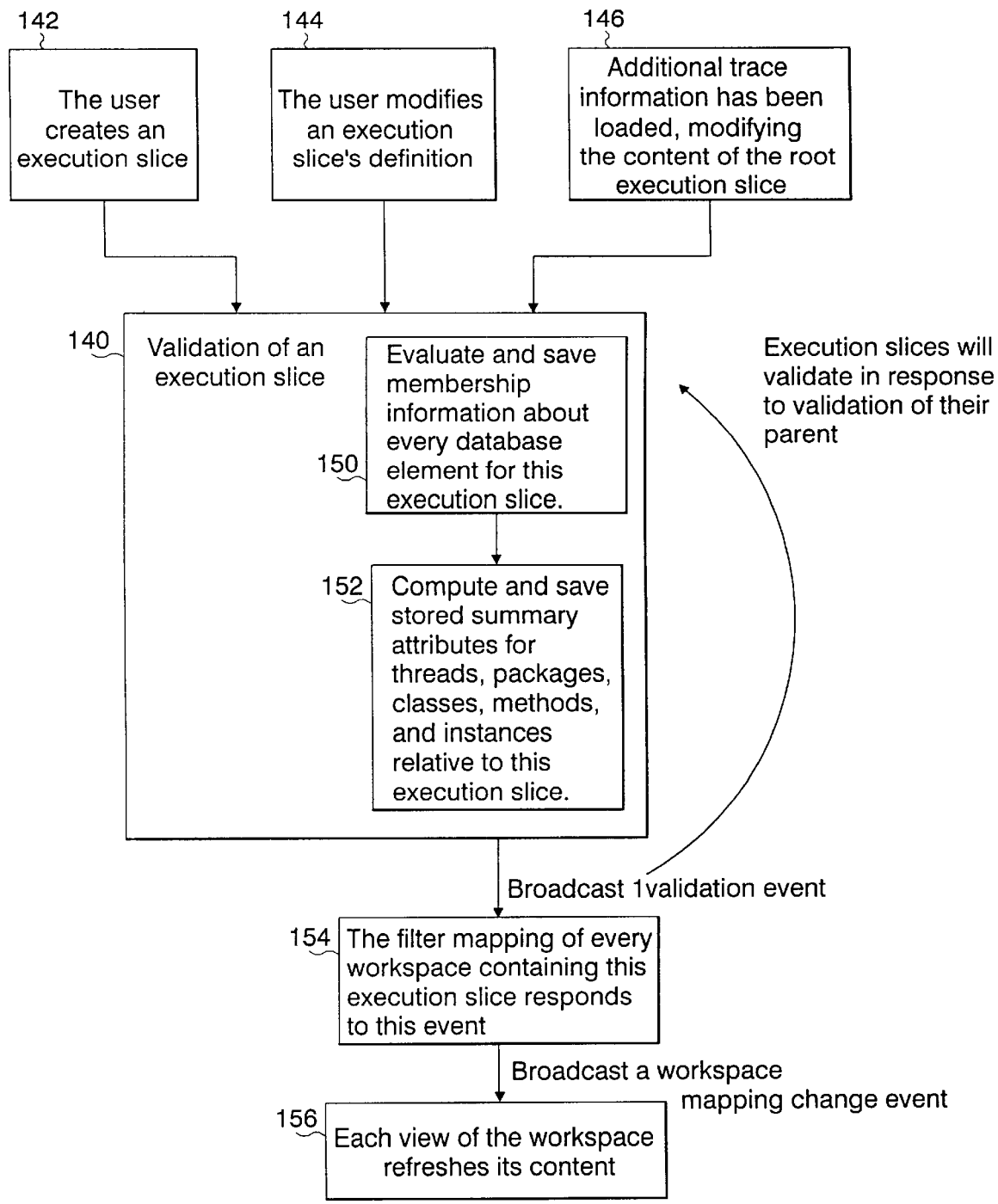
FIG. 8 outlines a procedure for the validation of an execution slice.

With reference to FIG. 8, validation, represented at 140, occurs only as needed for each execution slice, in response to the execution slice's creation 142, a change in its definition 144, or the validation of its parent. For the root execution slice representing the complete trace, validation will also occur after a new batch of trace information has been loaded 146 into the visualizer. Validation 140 itself is done in two phases. First, membership information is evaluated and saved 150. After that, most summary attributes are computed and saved 152. Once validation has completed for the execution slice, a validation event is broadcast. As represented at 154, any filter mapping that uses this execution slice will in turn broadcast an event to inform all views of its workspace to redisplay using the updated execution slice as represented at 156.

To conserve space and avoid unnecessary computations, the computation of some detailed summary attributes, such as summaries by individual invocations, are not done at validation time, but are postponed until values for specific elements and relative to specific execution slices are needed in a view. Of these attributes that are not stored in the database, the ones that are expensive to recompute are marked as such so that their values can be cached by the data tables of active views.

Execution Slices: Membership Representation and Computation

Storage of execution slice membership information is distributed throughout the database. Each Java object representing a database element has a bitmap describing which execution slices it belongs to. This element-centric rather than slice-centric representation matches the usage of the system, where the user is typically asking about a specific element as seen through the lens of various execution slices. This enables fast computations of membership for a given element, needed for computing summary values, coloring views based on membership, and supporting the hierarchy of slice filtering. This approach is space-efficient as well, since we expect the number of execution slices in a given analysis session to be relatively small, for example, on the order of tens, or hundreds.

FIGS. 9–13 show the algorithm for computing membership information for the entire database relative to a given execution slice. The algorithm takes advantage of recasting rules to optimize certain common usage cases. All of the rules are incorporated into the algorithm with just a single pass traversal of each of the calling trees. The various parts of the algorithm are shown in FIGS. 9–13. In particular, FIGS. 9, 10 and 11 show the execution slice membership algorithm, and FIGS. 12 and 13 show the algorithm to compute membership of invocations in an execution slice.

Query Evaluation

Evaluation of a query against an element consists of evaluating the boolean combination of query expressions against that element. For query expressions containing a subquery on a 1-1 relationship attribute, the subquery is evaluated against the element obtained by navigating the relationship (i.e. the attribute value). To evaluate a subquery on a 1-n relationship attribute, the related elements (i.e. the attribute values) are each evaluated against the subquery until at least one of them satisfies the criteria. Query optimization techniques such as reordering of terms, use of indexes, or converting subqueries into equivalent recasting rules are not currently used when evaluating queries.

Execution Slices: Computation of Stored Summary Attributes

FIGS. 14–17 describes the algorithm for computing all of the stored summary attributes in the database, relative to a given execution slice. The algorithm requires a single pass over all the invocations of the database.

Algorithm to Compute and Save Stored Summary Attributes Derived from Invocations This algorithm, shown in FIGS. 15–17, is a recursive algorithm computing stored summaries of execution-related measures for instances, methods, classes, and packages, based on a call tree rooted at a given invocation, relative to a given execution slice. The algorithm traverses the call tree depth-first in a single pass.

Attributes other than total cumulative time are computed as follows: on each visit to an invocation during the traversal, the appropriate summary attributes of elements related to that invocation are incremented if the invocation is in the given execution slice.

Cumulative time is computed on the way back up the tree, based on the currently visited invocation and the total cumulative time passed up from visiting the callees. The algorithm computes the cumulative time of each invocation relative to a given execution slice as follows. If the current invocation is in the given execution slice, then its cumulative time is computed by subtracting from the invocation's cumulative time the time that each of its callees spends that is not in the execution slice. If the current invocation is not in the execution slice, then its cumulative time is simply the sum of the time spent in the execution slice by each callee.

Within each grouping of invocations for which we are computing total cumulative time (by instance, by method, by method class, etc.) there will often be invocations that call each other either directly or indirectly. The computation of total cumulative time must therefore make sure not to count time in an invocation more than once. This is accomplished by keeping counters with each instance, method, class, and package to record if invocations are currently in progress in the tree traversal for that grouping. There are separate counters associated with each total cumulative time attribute when there is more than one such attribute in the same entity. For example, JClass has two total cumulative time attributes (representing time in methods of the class and time in instances of the class); each JClass will have a counter for each of these attributes.

To compute total cumulative time attributes for instances, methods, and classes, the counters work as follows. Each counter represents the number of invocations in progress in the tree traversal that, on their own, would have been included in the attribute computation. These counters are incremented on the way down the tree and decremented on the way back up. An invocation's time is allocated to a summary attribute only if its corresponding counter is 1.

An additional complication is required for packages, since summary attributes for a package include that package's entire hierarchy of subpackages. The algorithm avoids the costly process of traversing all the way up the package containment hierarchy for each invocation as follows. Each counter represents the number of that package's immediate children (i.e. classes or subpackages) that have at least one invocation in progress in the tree traversal. Only transitions between 0 and 1 in the counter for a class or package triggers an update to the containing package's counter. When time is allocated to a class (i.e. when its counter is 1), the time will be allocated to packages reached by traversing up the containment hierarchy only up to but not including the first package whose counter is greater than 1.

As mentioned above, a number of systems use queries of execution information to let the user filter out extraneous information and to group together elements into user-defined units. The Desert system (disclosed in "Software Visualization in the Desert Environment," Reiss, B. S., SCM PASTE 1998, Montreal, Quebec, Canada, 1998, pp. 59–66) provides a powerful query capability against static and dynamic information for various types of program understanding applications, as does the Hy+/GraphLog system (disclosed in Visualizing and Querying Distributed Event Traces with Hy+," Consens, M. P., et al., Lecture Notes in Computer Science, Vol. 819, Springer Verlag, 1994, pp. 123–141) for analyzing distributed and parallel programs. Snodgrass ("Relational Approach to Monitoring Complex Systems," Snodgrass, R. A., ACM Transactions on Computer Systems, Vol.6, No. 2, May 1988, pp. 157–196) allows queries to be used for analyzing operating system behavior, and Lencenvicius ("Dynamic Query-Based Debugging," Lencenvicious R., et al., ECOOP 1999, June 1999, Lisbon, Portugal, in Lecture Notes in Computer Science, Vol. 1628, Springer Verlag, pp. 135–160) uses queries of dynamic program information for the debugging of live programs. These systems all provide a great deal of flexibility, but differ from the approach of the present invention in significant ways.

First, the above systems use queries to produce a single result set of elements of a database entity or of a new type created as a result of the query. In either case, result sets based on queries differ significantly from execution slices, which use queries to create an independent dimension classifying the entire database of information. Classifying the entire database into execution slices provides the following advantages:

1. Execution slices may be automatically reused in many different views for different purposes (such as filtering, visual classification, and computation of measurements), and across many different types of information, giving the user a single consistent handle on an aspect of the program without requiring the user to restate the criteria.

2. Because execution slices maintain the structure but alter the apparent content of the database, they may be used to structure larger studies into workspaces, allowing the entire database to be studied as a unit under different filtering and grouping scenarios. Again, this could only be done in pure query-based systems by having the user restate the criteria in every view in every workspace.

Moreover, pure query-based approaches leave the user exposed to many details in order to apply the power of queries in visualizations and computations. In general, it is difficult to provide flexibility without introducing usability difficulties. Pure query-based approaches require the user to understand the intricacies of the data model, and complex query language concepts, to express common cases. With execution slices, however, recasting rules hide much of this complexity from the user, obviating the need for the user to specify complex subqueries in many common cases. In addition, execution slices provide additional task-oriented specification techniques that are not available in general purpose database systems. All of this is important within a single view, and, as mentioned above, it is of even greater value since the user will be studying the same information in many ways.

Computations of summary measures over tree-structured information, where there may be overlap in the resource being summarized, can be extremely difficult to express in general-purpose query-based systems, which are not designed for aggregating hierarchical information. Expressing computations of multidimensional measures, of fixed units against user-defined units, is even more difficult for the user to express in these systems. The problem is further compounded if the user needs to measure the same aspect against a number of different dimensions. Execution slices, designed specifically for the domain of program analysis, hide all of this detail from the user. In addition, the performance of the computations is highly optimized compared to general-purpose database systems.

OLAP systems ("OLAP Solutions: Building Multidimensional Information System," Thomsen, E., Wiley Computer Publishing ISBN 0-471-14391-4), which are more general purpose tools to analyze large databases in other problem domains, have some capabilities that are similar to the approach disclosed herein, but at the same time there are also significant differences. Filtering and drilling down to narrow a problem space are common features of OLAP systems, as are multidimensional reports, allowing the user to study summary measures at multiple levels of aggregation. Execution slices, however, provide both greater flexibility, and important advantages over OLAP systems specifically for analyzing programs. Execution slices provide the ability to pivot along a user-defined dimension of the trace information; OLAP systems do not provide the flexibility for users to define new dimensions based on arbitrary criteria. OLAP systems are also not capable of performing the type of computations required over hierarchical data such as call trees.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for analyzing dynamic behavior of a computer program using user-defined classifications of an execution trace, the method comprising:
    forming a database describing the execution of the program, the database including
        i) static information obtained from the program source, and
        ii) dynamic information describing particular executions of the program;
    structuring the database into entities, each of the entities containing a single type of information about the program execution, each entity consisting of elements representing individual program elements of said single type, each element having attributes with values describing the element;
    augmenting the database by classifying each element of the database as a member of zero or more user defined execution slices; and
    analyzing dynamic behavior of the program using the execution slices.

2. A method according to claim 1, wherein the execution slices are arranged as a hierarchy.

3. A method according to claim 1, wherein the execution slices are used to filter the elements presented in views.

4. A method according to claim 1, wherein the execution slices are used to filter the information on which summary measures are based.

5. A method according to claim 1, wherein the execution slices are used as an additional dimension, independent of the entity structure of the database, for the computation of multidimensional summary measures.

6. A method according to claim 1, wherein the execution slices are used to visually classify information.

7. A method according to claim 2, wherein a base execution slice and a number of subsets of that execution slice are used to filter the elements in a view and visually classify the remaining elements.

8. A method according to claim 2, wherein a base execution slice and a number of subsets of that execution slice are used to filter the information on which summary measures are based, and compare corresponding summary measures computed relative to each of the subset and base execution slices.

9. A method according to claim 1, wherein the execution slices are defined by a combination of filtering queries and recasting rules.

10. A method according to claim 1, wherein a user may define an execution slice by interactively selecting elements from a view.

11. A method according to claim 1, wherein a user may define an execution slice by classifying the values of an attribute.

12. A method according to claim 1, wherein the analyzing step includes the steps of:
    defining a workspace comprised of one of the execution slices, and subsets of said one of the execution slices; and
    performing an analysis using any number of views of workspace.

13. A method according to claim 12, wherein a number of workspaces are used to maintain multiple organizations of the information during a lengthy analysis process.

14. A method according to claim 1, wherein the analyzing step includes the steps of:
  displaying a view;
  selecting a number of elements in the view; and
  navigating to other views to study other elements related to the selected element.

15. A system for analyzing dynamic behavior of a computer program using user-defined classifications of an execution trace, the system comprising:
  a database describing the execution of the program, the database including
    i. static information obtained from the program source, and
    ii. dynamic information describing particular executions of the program;
  means for structuring the database into entities, each of the entities containing a single type of information about the program execution, each entity comprised of elements representing individual program elements of said single type, each element having attributes with values describing the element;
  an execution slice mechanism for augmenting the database by classifying every element of the database as a member of zero or more user defined execution slices; and
  a visualizer for analyzing dynamic behavior of the program using the execution slices.

16. A system according to claim 15, wherein the execution slices are arranged as a hierarchy.

17. A system according to claim 15, wherein the execution slices are used to filter the elements presented in views.

18. A system according to claim 15, wherein the execution slices are defined by a combination of filtering queries and recasting rules.

19. A system according to claim 15, wherein the visualizer includes:
  a workspace comprised of one of the execution slices, and subsets of said one of the execution slices; and
  means for performing an analysis using any number of views of the workspace.

20. A system according to claim 15, wherein the visualizer includes:
  a display for displaying a view;
  a selector for selecting a number of elements in the view; and
  a navigator for navigating to other views to study elements related to the selected elements.

21. A program storage device readable by machine, tangibly embodying a program of instructions executable by the machine to perform method steps for analyzing dynamic behavior of a computer program using user-defined classifications of an execution trace, said method steps comprising:
  forming a database describing the execution of the program, the database including
    i. static information obtained from the program source, and
    ii. dynamic information describing particular executions of the program;
  structuring the database into entities, each of the entities containing a single type of information about the program execution, each entity comprised of elements representing individual program elements of said single type, each element having attributes with values describing the element;
  augmenting the database by classifying each element of the database as a member of zero or more user defined execution slices; and
  analyzing dynamic behavior of the program using the execution slices.

22. A program storage device according to claim 21, wherein the execution slices are arranged as a hierarchy.

23. A program storage device according to claim 21, wherein the execution slices are used to filter the elements presented in views.

24. A program storage device according to claim 21, wherein the execution slices are defined by a combination of filtering queries and recasting rules.

25. A program storage device according to claim 21, wherein the analyzing step includes the steps of:
  defining a workspace comprised of one of the execution slices, and subsets of said one of the execution slices; and
  performing an analysis using any number of views of the workspace.

26. A program storage device according to claim 21, wherein the analyzing step includes the steps of:
  displaying a view;
  selecting a number of elements in the view; and
  navigating to other views to study elements related to the selected elements.

* * * * *